US008955378B2

(12) United States Patent
Clasquin et al.

(10) Patent No.: US 8,955,378 B2
(45) Date of Patent: Feb. 17, 2015

(54) WHEEL BALANCE AND FORCE MEASUREMENT PROCEDURE

(71) Applicant: Hunter Engineering Company, Bridgeton, MO (US)

(72) Inventors: Joel Clasquin, Highland, IL (US); Michael D. Gerdes, O'Fallon, MO (US)

(73) Assignee: Hunter Engineering, Inc., St. Louis, MO (US)

( * ) Notice: Subject to any disclaimer, the term of this patent is extended or adjusted under 35 U.S.C. 154(b) by 190 days.

(21) Appl. No.: 13/687,861

(22) Filed: Nov. 28, 2012

(65) Prior Publication Data

US 2013/0152679 A1 Jun. 20, 2013

Related U.S. Application Data

(60) Provisional application No. 61/577,481, filed on Dec. 19, 2011.

(51) Int. Cl.
*G01M 1/08* (2006.01)
*G01M 1/22* (2006.01)
*G01M 1/20* (2006.01)

(52) U.S. Cl.
CPC ...................................... *G01M 1/20* (2013.01)
USPC .............................. 73/460; 73/462

(58) Field of Classification Search
CPC ........... G01M 1/16; G01M 1/20; G01M 1/28; G01M 1/30; G01M 1/32; G01M 1/022; G01M 1/045; G01M 1/225; G01M 17/022
USPC .......................... 73/460, 462, 468, 458, 464
See application file for complete search history.

(56) References Cited

U.S. PATENT DOCUMENTS

| | | | |
|---|---|---|---|
| 5,103,595 A * | 4/1992 | Dale et al. | ......................... 451/5 |
| 6,336,364 B1 | 1/2002 | Parker et al. | |
| 6,397,675 B1 | 6/2002 | Colarelli, III et al. | |
| 6,405,591 B1 | 6/2002 | Colarelli, III et al. | |
| 6,422,074 B1 | 7/2002 | Colarelli, III et al. | |
| 6,435,027 B1 | 8/2002 | Colarelli, III et al. | |
| 6,523,408 B1 * | 2/2003 | Colarelli et al. | ................ 73/460 |
| 6,715,351 B1 * | 4/2004 | Gerdes et al. | ................... 73/462 |
| 6,799,460 B1 | 10/2004 | Parker et al. | |
| 6,854,329 B2 * | 2/2005 | Colarelli et al. | ................ 73/462 |
| 8,186,215 B2 * | 5/2012 | Douglas et al. | ................ 73/460 |
| 8,250,915 B1 * | 8/2012 | Voeller et al. | ................... 73/460 |
| 8,739,624 B2 * | 6/2014 | Sotgiu et al. | ................... 73/462 |
| 2008/0282799 A1 * | 11/2008 | Douglas et al. | ................ 73/460 |

* cited by examiner

*Primary Examiner* — Helen Kwok
(74) *Attorney, Agent, or Firm* — Polster, Lieder, Woodruff & Lucchesi, L.C.

(57) ABSTRACT

A method for efficiently operating a vehicle wheel balancing system having a wheel mounting structure upon which a vehicle wheel assembly is mounted for rotation during a measurement or service procedure, and a load roller assembly disposed in operative proximity to the wheel mounting structure for engaging a surface of the vehicle wheel assembly and applying a controlled load there to during rotation. After mounting a vehicle wheel assembly to the mounting structure, the wheel assembly is rotationally driven and a measurement of imbalance is initially acquired and the results displayed to an operator. Subsequently, the load roller assembly is engaged with the still rotating wheel, while measurements of radial forces and/or runout of the wheel are acquired, before the wheel rotation is stopped.

26 Claims, 5 Drawing Sheets

FIGURE 1 – PRIOR ART

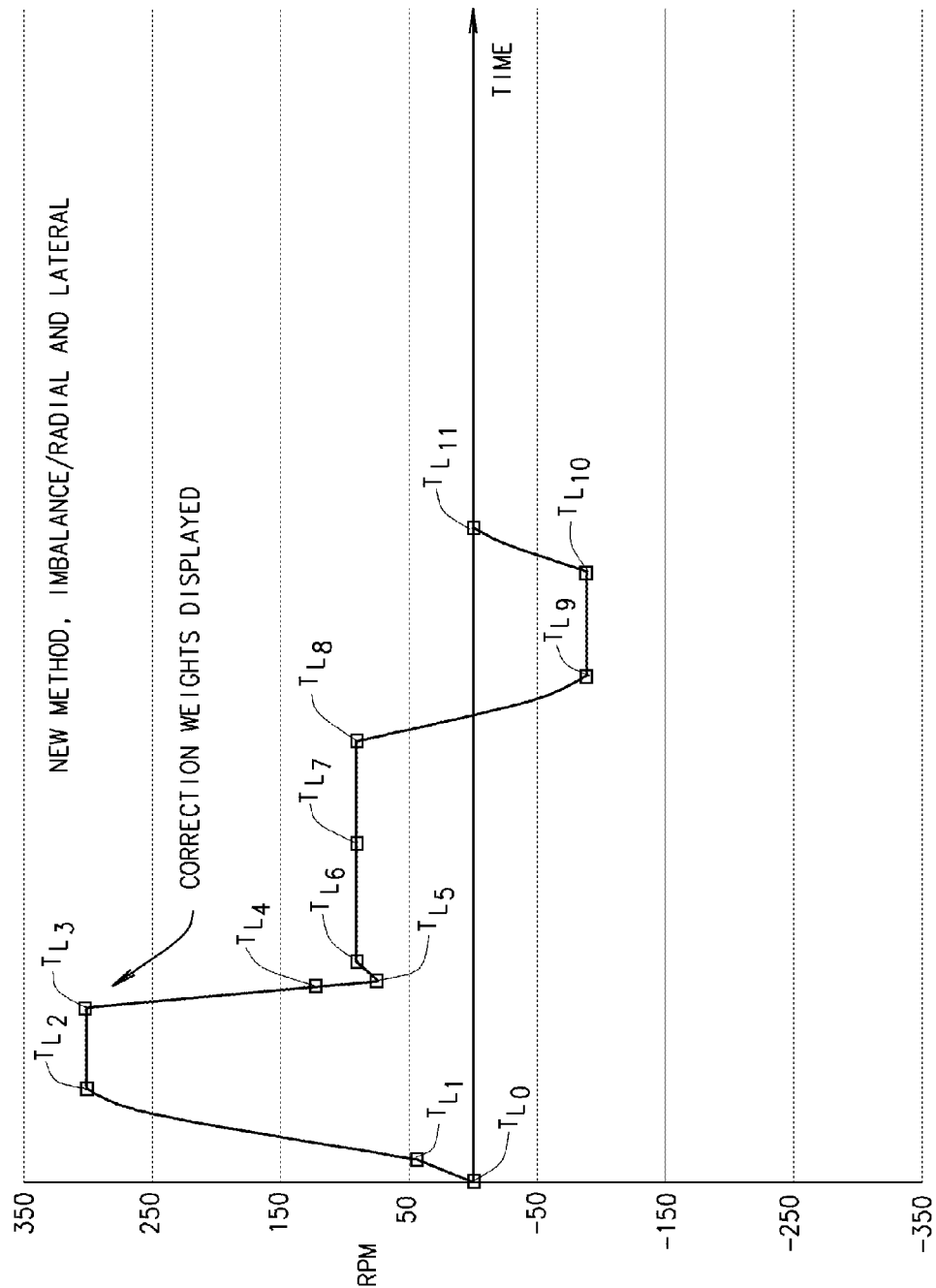

WHEEL BALANCE AND FORCE MEASUREMENT PROCEDURE

CROSS-REFERENCE TO RELATED APPLICATIONS

The present application is related to, and claims priority from, U.S. Provisional Patent Application Ser. No. 61/577,481 filed on Dec. 19, 2011, which is herein incorporated by reference.

STATEMENT REGARDING FEDERALLY SPONSORED RESEARCH

Not Applicable.

BACKGROUND OF THE INVENTION

The present invention is related generally to the operation of vehicle wheel balancing systems, and in particular, to optimized methods of operation for a vehicle wheel balancer system incorporating a load roller assembly used to apply a load to a vehicle wheel during a measurement cycle.

In high-volume automotive service shops, such as shops which specialize in vehicle wheel services such as tire mounting, balancing, and repair, there is a need to complete wheel service procedures quickly and efficiently, enabling the shop to provide rapid services for a large number of customers. Often, the customers wait on the premises for the repairs to be completed, and may become dissatisfied with the overall service if the repair process takes too long, regardless of the quality of the eventual outcome.

Some vehicle service procedures, such as wheel alignments, vehicle wheel balancing, and vehicle wheel mounting/dismounting operations require a relatively fixed period of time to complete, based on the time required to complete a standard sequential measurement and/or repair procedure using associated equipment such as a vehicle wheel alignment system or a vehicle wheel balancer.

For example, a vehicle wheel balancing system such as shown in FIG. 1, having a load roller assembly for applying loads to a wheel assembly during a measurement process, includes a control system configured to carry out standard sequential processes for the operation of the wheel balancer system as shown in FIGS. 2 and 3. These standard processes typically include the following sequence of steps: (a) mounting a wheel assembly to the machine; (b) driving the wheel rotationally to accelerate to a desired rotational speed (as at $T_0$ to $T_2$); (c) actuating the load roller assembly to engage a load roller against the surface of the rotating wheel (from $T_2$ to $T_3$); (d) measuring radial forces exerted by the rotating wheel under load for a selected period of time (from $T_3$ to $T_4$); (e) optionally actuating the load roller assembly to increase the force of engagement between the load roller and rotating wheel (as at $T_4$ to $T_{x1}$ in FIG. 3); (f) optionally measuring lateral forces exerted by the rotating wheel under load for a selected period of time (FIG. 3, $T_{x1}$ to $T_{x2}$); (g) driving the wheel rotationally to decelerate and reverse the direction of rotation, followed by acceleration to return to the desired rotational speed (in the opposite direction) ($T_4$ to $T_6$ in FIG. 2, $T_{x2}$ to $T_{x3}$ in FIG. 3); (h) optionally measuring lateral forces exerted by the rotating wheel under load for a selected period of time (while rotating in the opposite direction) ($T_{x3}$ to $T_{x4}$ in FIG. 3); (i) actuating the load roller assembly disengage the load roller from the rotating wheel ($T_4$ to $T_5$ in FIG. 2); (j) accelerating the wheel rotational speed to a second desired rotational speed ($T_5$ to $T_6$ in FIG. 2, $T_{x4}$ to $T_{x5}$ in FIG. 3); (k) measuring imbalance of the rotating wheel at the second desired rotational speed ($T_6$ to $T_7$ in FIG. 2, $T_{x5}$-$T_{x6}$ in FIG. 3); (l) displaying measurement results to the operator (at $T_7$ and $T_{x6}$); and (m) driving the wheel rotationally to decelerate it to a stop ($T_7$ to $T_8$ in FIG. 2, $T_{x6}$ to $T_{x7}$ in FIG. 3). Once the wheel rotation has stopped, the operator can then proceed to carry out any required additional steps, such as applying or removing imbalance correction weights based on the displayed measurement results.

Accordingly, it would be advantageous to provide an optimized process for the operation of a vehicle wheel balancer and load roller assembly which reduces the length of time required to complete an imbalance and force measurement process for a vehicle wheel assembly, and which enables a vehicle repair shop to complete a vehicle service procedure in a shorter period of time, without a reduction in service quality.

BRIEF SUMMARY OF THE INVENTION

Briefly stated, the present disclosure sets forth a method for efficiently operating a vehicle wheel balancing system having a wheel mounting structure upon which a vehicle wheel assembly is mounted for rotation during a measurement or service procedure, and a load roller assembly disposed in operative proximity to the wheel mounting structure for applying a controlled load to a vehicle wheel assembly during rotation. After mounting a vehicle wheel to the structure, the wheel is rotationally driven and a measurement of imbalance is initially acquired. Subsequently, the load roller assembly is actuated to apply a load to the rotating wheel, while measurements of radial forces and/or runout of the wheel are acquired concurrently, before the wheel rotation is stopped.

In one embodiment of the present disclosure, the method for efficiently operating the vehicle wheel balancing system includes controlling rotational speed, direction, and acceleration of the vehicle wheel assembly during the steps of measuring the imbalance and measuring the radial forces and/or runout of the vehicle wheel assembly. The rotational speed, direction, and acceleration of the wheel assembly are controlled to: (a) initially provide a constant acceleration in a first rotational direction for a first period to measure the wheel's inertia; (b) at the end of said first period, accelerate the vehicle wheel assembly in the first rotational direction for a second period to achieve a selected rotational speed; (c) hold said vehicle wheel assembly at the selected rotational speed for a third period during which the step of measuring an imbalance is completed; (d) at the end of the third period, decelerate the vehicle wheel assembly to a second selected rotational speed in the first rotational direction, with a load roller engaged with the surface of the rotating vehicle wheel assembly at the second selected rotational speed; (e) optionally accelerate the vehicle wheel assembly to a third selected rotational speed in the first rotational direction while engaged with the load roller; (f) maintain either the second selected rotational speed or the optional third selected rotational speed in the first rotational direction during the step of measuring the radial forces and/or runout of the vehicle wheel assembly; and (g) smoothly decelerate the wheel assembly to a stop.

In a next embodiment of the present disclosure, the rotational speed, direction, and acceleration of the wheel assembly are further controlled to: (h) accelerate the wheel assembly in an opposite rotational direction from the stop, to return to the second selected rotational speed or the optional third selected rotational speed; (i) measure lateral forces of the vehicle wheel assembly during rotation of the vehicle wheel assembly in the second and opposite rotational direction while in engagement with the load roller; and (k) decelerate the wheel assembly to a final stop while in engagement with the load roller following measurement of the lateral forces.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is a plot of time vs. rotational speed for an optimized vehicle wheel balancer procedure of the present disclosure for measuring radial forces, lateral forces, and wheel imbalance.

Corresponding reference numerals indicate corresponding parts throughout the several figures of the drawings. It is to be understood that the drawings are for illustrating the concepts set forth in the present disclosure and are not to scale.

Figure 1:
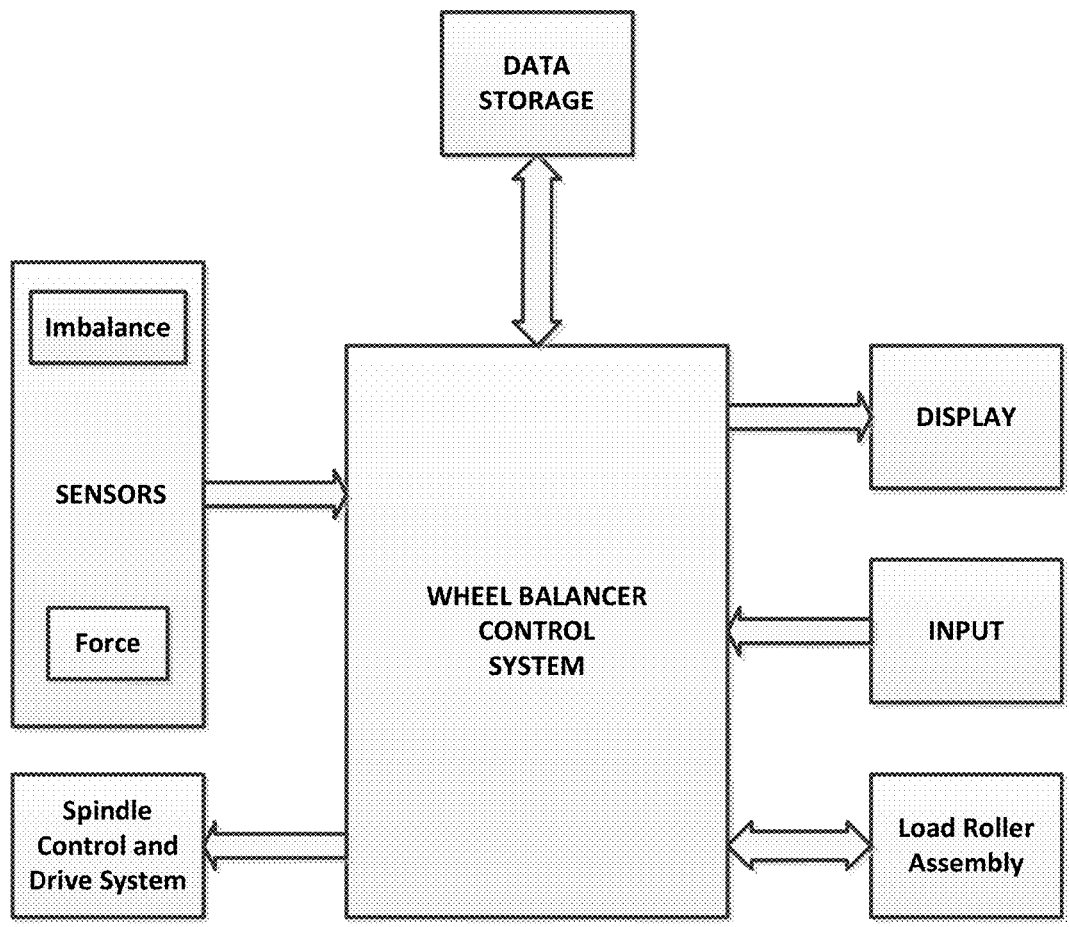
FIG. 1 is a simplified block diagram of the components found in an exemplary prior art vehicle wheel balancer system having a load roller assembly.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present disclosure sets forth methods for optimizing the operation of a vehicle wheel service system, such as a vehicle wheel balancing system, having a load roller assembly configured for applying a force to a rotating vehicle wheel assembly mounted upon the service system during a measurement procedure, such as illustrated generally in FIG. 1 and as described in U.S. Pat. No. 6,336,364 B1 to Parker et al., U.S. Pat. No. 6,799,460 B1 to Parker et al., U.S. Pat. No. 6,435,027 B1 to Colarelli, III et al., U.S. Pat. No. 6,405,591 B1 to Colarelli, III et al., U.S. Pat. No. 6,422,074 B1 to Colarelli, III et al., U.S. Pat. No. 6,397,675 B1 to Colarelli, III et al., and U.S. Pat. No. 6,854,329 B2 to Colarelli, III et al., each of which is herein incorporated by reference. Those of ordinary skill in the art will recognize that the specific mechanical configuration of the vehicle wheel service or balancing system can be varied from that which is shown in FIG. 1 without departing from the scope of the invention, so long as the functionality for mounting a vehicle wheel assembly, rotationally driving the wheel assembly, applying a load to the rotating wheel assembly, and obtaining and displaying measurement data associated with the vehicle wheel assembly is provided.

Figure 4:
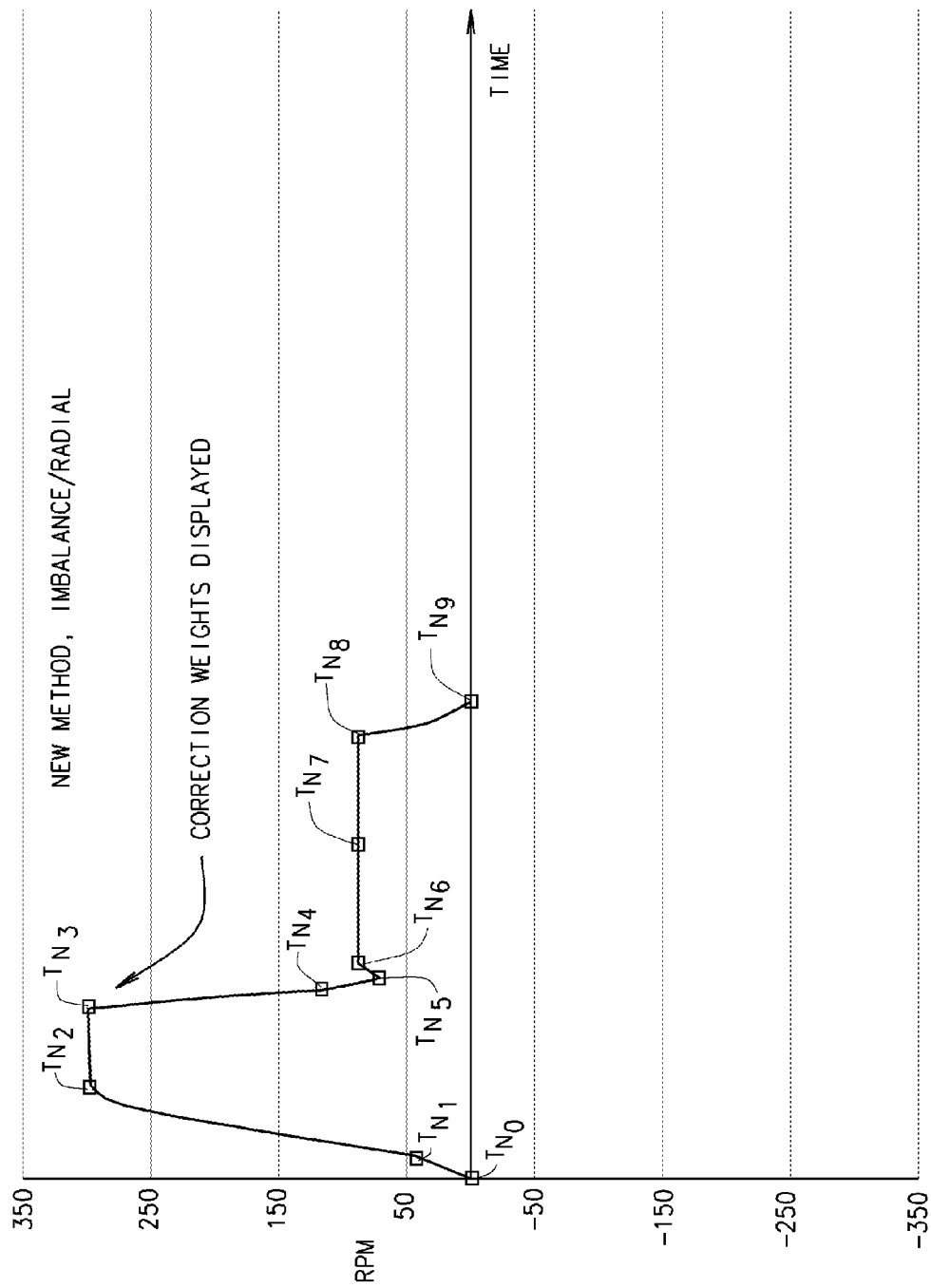
FIG. 4 is a plot of time vs. rotational speed for an optimized vehicle wheel balancer procedure of the present disclosure for measuring radial forces and wheel imbalance.

Using the procedures of the present disclosure, a vehicle wheel assembly, consisting of a wheel rim and an installed tire, is initially mounted to the vehicle wheel balancer system in a conventional manner, typically by centered mounting on a driven spindle, and secured in place by either an automatic clamping mechanism or a threaded retainer. Referring generally to FIG. 4, once the wheel assembly is secured in place on the vehicle wheel balancer system, a sequence of measurement procedures is begun under direction of an associated control system, by engaging a drive system to rotationally drive the spindle to accelerate the wheel assembly to a desired rotational speed after which imbalance measurements are acquired either during a controlled rotation or a "free-wheeling" rotation, and the results displayed to an operator by the control system. Subsequently, while the imbalance measurements are being displayed, the spindle speed is reduced or decelerated either under direction from the control system applying a braking force or by allowing inherent frictional forces within the assembly to decelerate the rotating spindle, and a load roller assembly is actuated to move a load roller into engagement with the outer circumference of the wheel assembly. The load roller assembly is configured and controlled by the control system to apply a load to the rotating wheel assembly while measurements of radial forces and/or runout of the wheel assembly are acquired, before the wheel rotation is stopped, and the resulting measurements are displayed to an operator for any necessary corrective actions. By operating the vehicle wheel balancer system to measure imbalance of the vehicle wheel assembly prior to measuring radial forces and/or runout, and by performing all of these measurement operations while the vehicle wheel assembly is rotating in the same direction, the overall efficiency of the measurement process is improved over the prior art procedures shown in FIG. 2. These improvements can be seen as a reduction in the total time required to complete the measurement process, as well as an increase in operator efficiency which is achieved by providing the operator with the imbalance measurement data before the completion of the radial force and/or runout measurements, allowing the operator sufficient time to locate any necessary imbalance correction weights during the completion of the measurement process.

As can be seen in FIG. 4, the method for efficiently operating the vehicle wheel balancing system requires that the control system be configured for selectively controlling rotational speed, direction, and acceleration of the vehicle wheel assembly during the steps of measuring the imbalance and measuring the radial forces and/or runout of the vehicle wheel assembly. At the start of the procedure, denoted at $T_{N0}$ in FIG. 4, the rotational speed, direction, and acceleration of the wheel assembly are controlled by the control system to initially provide a constant acceleration in a first rotational direction for a first time period ($T_{N0}$-$T_{N1}$), during which the inertia of the wheel assembly can be measured by sensors operatively coupled to the control system.

At the end of said first period, the wheel assembly is accelerated in the first rotational direction for a second period of time ($T_{N1}$-$T_{N2}$) to achieve a selected rotational speed after which the imbalance measurements are to be acquired, such as 300 RPM. The vehicle wheel assembly is preferably maintained at the selected rotational speed for a third period of time ($T_{N2}$-$T_{N3}$) during which measurements of any imbalance present in the vehicle wheel assembly are completed. However, it will be recognized that the vehicle wheel assembly may be allowed to coast or "free-wheel" decelerate during the acquisition of the imbalance measurements. Following the third period, the vehicle wheel assembly is decelerated over a brief period of time ($T_{N3}$-$T_{N4}$), in a controlled fashion to avoid loosening the clamping mechanism or threaded retainer used to retain the wheel assembly on the spindle, towards a second selected slower rotational speed in the first rotational direction. Alternatively, the deceleration of the when assembly from ($T_{N3}$-$T_{N4}$) may be done without application of external braking forces if sufficient frictional forces are inherent within the spindle assembly and coupled components. As the wheel assembly rotational speed slows, a load roller of a load roller assembly is engaged (such as during the period $T_{N4}$-$T_{N5}$) with the outer circumferential surface of the rotating vehicle wheel assembly at the second selected rotational speed (typically 75 RPM). The load roller may be engaged with the rotating vehicle wheel assembly either by actuation of the load roller assembly, by displacement of the spindle, or by a combination of both actuation and displacement.

Optionally, at ($T_{N5}$-$T_{N6}$) if the wheel assembly is not too large (such as determined by a position of either the load roller or spindle when in engagement with the tire circumferential surface and the previously obtained inertia measurements) the rotational speed of the wheel assembly may be accelerated slightly to a third selected rotational speed in the first rotational direction (typically 90 RPM). The rotational speed should not be increased for large size tires because they are more likely to have rough tread that will cause the load roller to hop or stall the associated drive motor. Preferably, there is hysteresis built into the decision to increase the motor RPM, and the target RPM is "sticky" so that the vehicle wheel balancer system will default to the same rotational speed used during an immediately previous wheel assembly measurement cycle, on the assumption that an operator will be servicing a set of wheel assemblies of the same size. The target RPM will change only if the wheel assembly outer circumference is less than an established threshold to increase the rotational speed, or exceeds a second established threshold for decreasing the rotational speed.

The selected target rotational speed of the wheel assembly is then maintained over a period of time ($T_{N6}$-$T_{N7}$) at either the second selected rotational speed or the optional third selected rotational speed while the load roller is engaged to apply a selected amount of force to the vehicle wheel assembly. Once the selected force is applied, the wheel assembly is rotationally driven for an additional period of time ($T_{N7}$-$T_{N8}$), during which time the radial forces of the vehicle wheel assembly are measured. Finally, the wheel assembly is decelerated to a stop ($T_{N8}$-$T_{N9}$) either by braking or inherent friction, and the measurement cycle concluded.

Figure 2:
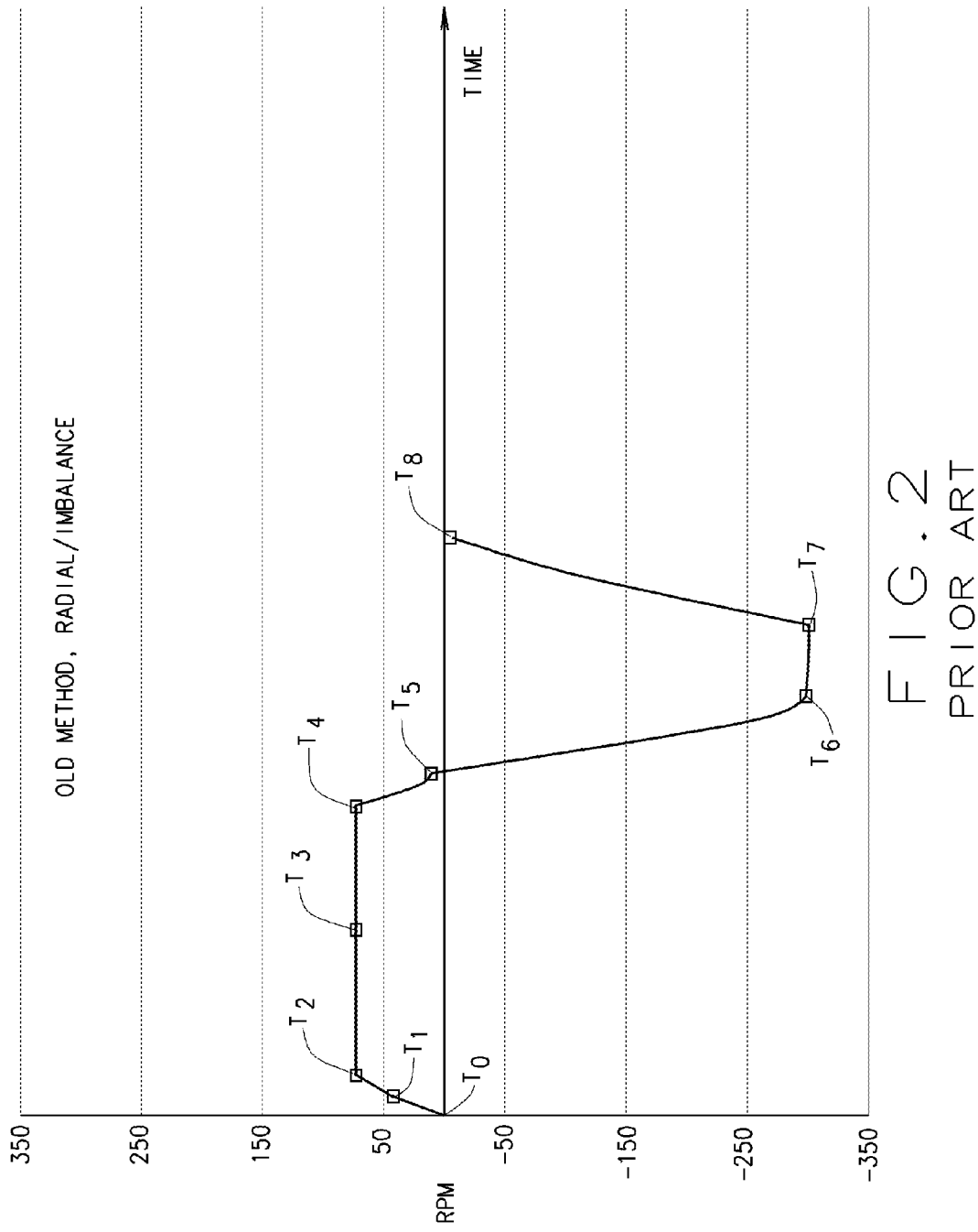
FIG. 2 is a plot of time vs. rotational speed for a prior art vehicle wheel balancer procedure for measuring radial forces and wheel imbalance.

It will be readily apparent from the aforementioned procedure that the process is substantially automated once begun, and that any operator required interaction is minimal. Accordingly, it will be appreciated that the measured imbalance data can be displayed early in the cycle to the operator at the completion of the imbalance measurement phase ($T_{N3}$), and the operator can efficiently utilize the remaining time ($T_{N3}$-$T_{N9}$) to locate any required imbalance correction weights and prepare for their application to the vehicle wheel assembly once it is stopped rotation ($T_{N9}$). In contrast, as seen in FIG. 2, the prior art procedures measure the imbalance of the vehicle wheel assembly last, requiring the operator to wait until the entire measurement cycle is completed before identifying and locating any required imbalance correction weights and preparing for their application to the vehicle wheel assembly, unnecessarily extending the total time required to complete the wheel assembly service procedure.

Optionally, the procedure of the present disclosure shown in FIG. 4 may be modified to efficiently measure lateral forces present in the rotating vehicle wheel assembly by further controlling the rotational speed, direction, and acceleration of the wheel assembly as shown in FIG. 5. It will be understood that the sequence of steps occurring over the time $T_{L0}$-$T_{L7}$ of FIG. 5 are identical to the sequence of steps which are set forth and described above over the time $T_{N0}$-$T_{N7}$ in FIG. 4. During the measurement of the radial forces of the vehicle wheel assembly at time ($T_{L7}$-$T_{L8}$), an additional set of measurements of the wheel lateral forces are obtained. Measurements from both a lateral force sensor and a radial runout sensor at the exemplary rate of 128 samples per rotation may be acquired while the wheel is spinning in the first rotational direction may be acquired using an exemplary spindle encoder that generates 512 interrupts per revolution. To optimize usage of an analog signal channel, a radial force measurement is acquired on one interrupt, after which the analog channel is switched during the next interrupt, and a lateral force measurement is acquired on the third interrupt. The analog channel is then switched back to the first channel on the fourth interrupt, and the process is repeated for each revolution of the vehicle wheel assembly.

With the procedure shown in FIG. 5, instead of decelerating the wheel assembly to a stop ($T_{N9}$) as was done previously in FIG. 4, the measurement process continues by decelerating and subsequently accelerating the wheel assembly in an opposite rotational direction through the stop point for a period of time ($T_{L8}$-$T_{L9}$), to return to the second selected rotational speed or the optional third selected rotational speed, but while rotating in an opposite direction. Once the desired speed is reached, a second set of lateral force measurements of the vehicle wheel assembly are acquired while in engagement with the load roller ($T_{L9}$-$T_{L10}$). Finally, the wheel assembly is slowed to a stop following measurement of the lateral forces ($T_{L10}$-$T_{L11}$). Preferably, a load roller arm angle sensor is utilized to identify when the load roller has been backed off the wheel assembly outer circumferential surface at the end of the service procedure. However, other means for detecting disengagement between the load roller and vehicle wheel assembly may be utilized depending upon the particular mechanical construction employed. It is necessary to ensure the load roller is no longer in contact with the wheel assembly before acquiring a final reading from the lateral force sensor to check for a change in zero offset during the spinning rotation of the wheel assembly. Previously, a fixed delay was implemented between the command to disengage the load roller and the final lateral force measurement. By changing the procedure to record the load roller arm angle at the moment when the load roller first contacts the tire and then subsequently observing the load roller arm angle for a return to this angle (plus a little more) permits the final lateral force measurement to be acquired earlier than previous procedures.

Figure 3:
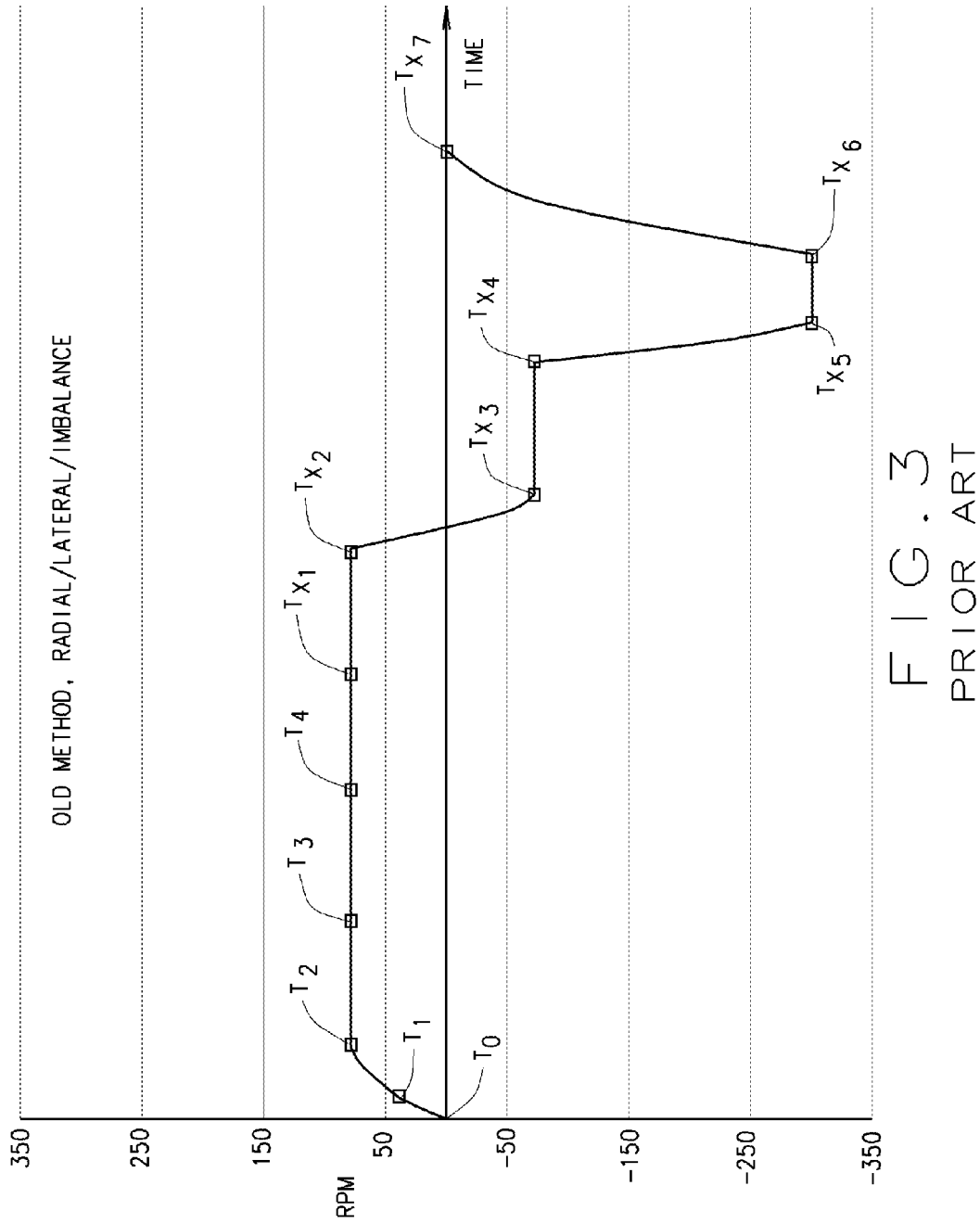
FIG. 3 is a plot of time vs. rotational speed for a prior art vehicle wheel balancer procedure for measuring radial forces, lateral forces, and wheel imbalance.

It will be readily apparent from the aforementioned procedure that the process as shown in FIG. 5 remains substantially automated once begun, and operator required interaction is minimal. Accordingly, it will be appreciated that the measured imbalance data can be displayed to the operator at the completion of the imbalance measurement phase ($T_{L3}$), and the operator can efficiently utilize the remaining time ($T_{L3}$-$T_{L11}$) to locate any required imbalance correction weights and prepare for their application to the vehicle wheel assembly once it is stopped ($T_{L11}$). In contrast, as seen in FIG. 3, the prior art procedures measure the imbalance of the vehicle wheel assembly last, requiring the operator to wait until the entire measurement cycle is completed before locating any required imbalance correction weights and preparing for their application to the vehicle wheel assembly, unnecessarily extending the time required to complete the wheel assembly service procedure.

Those of ordinary skill in the art will recognize that a variety of additional time-saving changes may be made in the operation of a vehicle wheel balancing system, depending upon the specific mechanical configuration of the wheel balancer and load roller assembly. For example, in a vehicle wheel balancing system employing a pneumatically driven load roller assembly, it has been common practice to delay the start of measurements for a substantial period of time (over ½ of a second) after "filling" the airbag utilized to engage the load roller with the wheel assembly outer circumferential surface, to allow the applied forces to stabilize. It has been observed that the forces stabilize much faster, and that the delay may be reduced to $\frac{1}{10}^{th}$ of a second without compromising measurement data.

Optionally, vehicle wheel balancer systems can eliminate force transducer reference readings taken before the load roller is engaged. Previously, vehicle wheel balancer systems were comparing one full revolution of the vehicle wheel with these reference readings to live readings taken from the force transducers to identify load roller contact with the wheel assembly outer circumferential surface. This comparison process has proved unnecessary, and may be replaced by simply observing any a large change in the live reading from the force transducers in the vehicle wheel balancer system, without comparison to an unloaded reference measurement previously obtained during an unloaded rotation of the vehicle wheel assembly.

Optionally, for pneumatically actuated load roller assemblies utilizing an inflatable airbag to engage the load roller with the wheel assembly, it is possible to reduce the time required to inflate the airbag. Conventional systems use an algorithm to carry out an inflation cycle, pause, read the resulting pressure, determine the amount of progress, and adjust the length of the next fill cycle based on the progress and the difference between the target and actual pressure. A vehicle wheel balancer system of the present disclosure, equipped with a pneumatically actuated load roller assembly may optionally determine the length of a single fill cycle by utilizing an equation based on the diameter of the tire, the incoming air pressure from a fill source, and the target roller force to be applied to the vehicle wheel assembly. The goal when inflating the airbag is not trying to reach an exact target pressure, but rather is just to be consistent so that the system does not apply different amounts of roller force when measuring the same tire twice. The current algorithms do a good job of being consistent because it is also good at reaching an exact target pressure level. Using an optimized single-fill cycle may not hit the target pressure accurately, but it is sufficiently consistent if the source air pressure does not change, or if the control system monitors the source air pressure and adjusts the fill time accordingly in response to changes in the available air pressure. This is especially effective when utilizing larger air lines and valves to shorten the length of the single fill cycle.

Alternatively, the vehicle wheel balancer system may be configured to monitor the load roller assembly to detect physical contact between the load roller and the vehicle wheel assembly surface. For example, when utilizing a pneumatically actuated load roller assembly with an inflatable airbag, it will be recognized that during the initial stages of inflation, prior to actual contact between the load roller and the vehicle wheel assembly, incoming air pressure from the fill source will increase the volume of the inflatable bag. Once contact is achieved between the load roller and the vehicle wheel assembly, the rate of inflation for the inflatable bag will change, and a greater portion of the incoming air pressure will result in an increase in air pressure within the inflatable bag. By monitoring the air pressure levels within the inflatable bag to identify a change in the rate of a pressure increase, the vehicle wheel balancer system may be configured to detect physical contact between the load roller and the vehicle wheel assembly surface. Mechanical position sensors disposed to monitor a rate of change of load roller angular movement, or force sensors disposed to measure applied forces resulting movement of the load roller assembly may similarly be utilized and monitored to identify observable changes to the monitored signals which occur when the load roller contacts the vehicle wheel assembly. Those of ordinary skill in the art will recognize that the vehicle wheel balancer system may be similarly configured to detect physical contact between the load roller and the vehicle wheel assembly surface by monitoring displacement movement of the spindle shaft in configurations having a stationary load roller.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure. For example, a vehicle wheel balancer control system, such as shown in FIG. 1, can be configured by one of ordinary skill in the art with suitable software instructions to carry out the procedures disclosed herein and to implement the methods of the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, such as a vehicle wheel balancer control system, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for operating a vehicle wheel service system having a wheel mounting structure upon which a vehicle wheel assembly is mounted for rotation during a measurement or service procedure, and a load roller assembly disposed in operative proximity to said wheel mounting structure, said load roller assembly including a load roller for applying a controlled load to the vehicle wheel assembly mounted to said wheel mounting structure during rotation, the operating method comprising:

mounting the vehicle wheel assembly onto said mounting structure;
rotationally driving said vehicle wheel assembly on said mounting structure in a first rotational direction;
measuring an imbalance of the vehicle wheel assembly during said rotation;

following measurement of said imbalance, engaging said load roller of said load roller assembly with a surface of the rotating vehicle wheel assembly;

subsequently measuring radial forces and/or runout of the vehicle wheel assembly during said rotation of the vehicle wheel assembly in said first rotational direction and while in engagement with said load roller; and presenting an operator with a display of information associated with said measured imbalance before measuring said radial forces and/or runout of the vehicle wheel assembly is completed.

2. The method of claim 1 where said step of rotationally driving said vehicle wheel assembly on said mounting structure includes controlling a rotational speed, a rotational direction, and an acceleration of said vehicle wheel assembly during at least one of said measuring said imbalance and said measuring said radial forces and/or runout of the vehicle wheel assembly.

3. The method of claim 2 wherein said rotational speed, said rotation direction, and said acceleration is controlled to
    (a) initially provide a constant acceleration in a first rotational direction for a first period of time;
    (b) at an end of said first period of time, accelerate said vehicle wheel assembly in said first rotational direction for a second period of time to achieve a first selected rotational speed;
    (c) measure an imbalance of said vehicle wheel assembly during a third period of time after said first selected rotational speed is achieved;
    (d) at an end of said third period of time, decelerate said vehicle wheel assembly to a second selected rotational speed in said first rotational direction, said load roller engaged with said surface of the rotating vehicle wheel assembly at said second selected rotational speed;
    (e) optionally accelerate said vehicle wheel assembly to a third selected rotational speed in said first rotational direction;
    (f) maintain either said second selected rotational speed or said optional third selected rotational speed in said first rotational direction during said step of measuring of said radial forces and/or runout of the vehicle wheel assembly; and
    (g) decelerate said wheel assembly to a stop.

4. The method of claim 3 wherein said vehicle wheel assembly is maintained at said first selected rotational speed during said third period of time.

5. The method of claim 3 wherein said display of said measured imbalance of the vehicle wheel assembly is presented to said operator at said end of said third period of time.

6. The method of claim 3 wherein said rotational speed, said rotational direction, and said acceleration is further controlled to accelerate said wheel assembly from said stop to return to said second selected rotational speed or said optional third selected rotational speed in a second and opposite rotational direction;
    wherein lateral forces of the vehicle wheel assembly are measured during said rotation of the vehicle wheel assembly in said second and opposite rotational direction while in engagement with said load roller; and
    wherein said wheel assembly is decelerated to a stop while in engagement with said load roller following measurement of said lateral forces.

7. The method of claim 6 wherein a portion of measuring said radial forces and/or runout of the vehicle wheel assembly is completed during rotation of the vehicle wheel assembly in said second and opposite rotational direction while in engagement with said load roller.

8. The method of claim 2 wherein said rotational speed is controlled in response to one or more characteristics of the wheel assembly, said characteristics including, but not limited to, wheel assembly inertia and wheel assembly outer diameter.

9. The method of claim 2 wherein said rotational speed is selected prior to mounting the vehicle wheel assembly, and wherein said selected rotational speed is altered in response to a measured characteristic of the vehicle wheel assembly exceeding a threshold.

10. The method of claim 1 further including measuring lateral forces of the vehicle wheel assembly during said rotation of the vehicle wheel assembly in engagement with said load roller.

11. The method of claim 10 wherein said measuring lateral forces is conducted concurrent with said measuring of radial forces and/or runout of the vehicle wheel assembly during said rotation of the vehicle wheel assembly in said first rotational direction.

12. The method of claim 1 wherein said engaging said load roller of said load roller assembly with said surface of the rotating vehicle wheel assembly engages said load roller and said surface with a constant force.

13. The method of claim 1 wherein said load roller assembly includes a pneumatic actuator, and wherein said engaging said load roller of said load roller assembly with said surface of the rotating vehicle wheel assembly includes inflating said pneumatic actuator.

14. The method of claim 13 wherein said pneumatic actuator is inflated for a select period of time.

15. The method of claim 13 further including monitoring a rate of change of pressure within said pneumatic actuator to detect contact between said load roller assembly and said surface of the rotating vehicle wheel assembly.

16. The method of claim 1 wherein said engaging said load roller of said load roller assembly with said surface of the rotating vehicle wheel assembly further includes monitoring a rate of change of position of said load roller assembly to detect contact between said load roller assembly and said surface of the rotating vehicle wheel assembly.

17. The method of claim 1 wherein said display of information associated with said measured imbalance is presented to said operator before engaging said load roller of said load roller assembly with said surface of the rotating vehicle wheel assembly.

18. A method for operating a vehicle wheel service system having a wheel mounting structure upon which a vehicle wheel assembly is mounted for rotation during a measurement or service procedure, and a load roller assembly disposed in operative proximity to said wheel mounting structure, said load roller assembly including a load roller for engaging the vehicle wheel assembly mounted to said wheel mounting structure to apply a controlled load during rotation of the vehicle wheel assembly, the operating method comprising:
    mounting the vehicle wheel assembly onto said mounting structure;
    rotationally driving said vehicle wheel assembly on said mounting structure in a first rotational direction;
    engaging said load roller of said load roller assembly with a surface of the rotating vehicle wheel assembly;
    measuring radial forces and/or runout of the vehicle wheel assembly during said rotation of the vehicle wheel assembly in said first rotational direction and while in engagement with said load roller;
    measuring lateral forces of the vehicle wheel assembly during said rotation of the vehicle wheel assembly in engagement with said load roller concurrent with said measuring radial forces and/or runout of the vehicle wheel assembly;

decelerating said rotating vehicle wheel assembly to a stop; and disengaging said load roller of said load roller assembly from said surface of the vehicle wheel assembly.

19. The method of claim 18 further including the measuring an imbalance of the vehicle wheel assembly during said rotation, prior to said engaging said load roller of said load roller assembly with said surface of the rotating vehicle wheel assembly; and providing a display of said measured imbalance prior to the disengaging said load roller of said load roller assembly from said surface of the vehicle wheel assembly.

20. A vehicle wheel service system having a wheel mounting structure upon which a vehicle wheel assembly is mounted for driven rotation by a drive system during a measurement or service procedure, a load roller assembly disposed in operative proximity to said wheel mounting structure, said load roller assembly including a load roller for engaging the vehicle wheel assembly mounted to said wheel mounting structure during rotation to apply a controlled load there to, sensors for measuring parameters associated with said vehicle wheel assembly, and a control system operatively coupled to the drive system, the load roller assembly, and the sensors, comprising:

the control system configured with software instructions to carry out a vehicle wheel assembly service procedure which includes engaging said drive system to rotationally drive the vehicle wheel assembly disposed on said mounting structure in a first rotational direction;

measuring with said sensors, an imbalance of the vehicle wheel assembly during said rotation;

engaging said load roller of said load roller assembly with a surface of the rotating vehicle wheel assembly after measurement of said imbalance;

subsequently measuring, with said sensors, radial forces and/or runout of the vehicle wheel assembly during said rotation of the vehicle wheel assembly in said first rotational direction and while in engagement with said load roller; and presenting an operator with a display of information associated with said measured imbalance before said measuring of said radial forces and/or runout of the vehicle wheel assembly is completed.

21. The vehicle wheel service system of claim 20 where said control system is further configured with software instructions to control a rotational speed, a rotational direction, and an acceleration of said vehicle wheel assembly when measuring said imbalance and when measuring said radial forces and/or runout of the vehicle wheel assembly.

22. The vehicle wheel service system of claim 21 wherein said control system is further configured with software instructions to control said rotational speed, said rotational direction, and said acceleration to (a) initially achieve a constant acceleration in a first rotational direction for a first period of time;

(b) at an end of said first period of time, accelerate said vehicle wheel assembly in said first rotational direction for a second period of time to achieve a first selected rotational speed;

(c) to carry out said measurement of said imbalance during a third period of time after achieving said first selected rotational speed;

(d) at an end of said third period of time, decelerate said vehicle wheel assembly to a second selected rotational speed in said first rotational direction, said load roller engaged with said surface of the rotating vehicle wheel assembly at said second selected rotational speed;

(e) optionally accelerate said vehicle wheel assembly to a third selected rotational speed in said first rotational direction;

(f) maintain either said second selected rotational speed or said optional third selected rotational speed in said first rotational direction during said measuring of said radial forces and/or runout of the vehicle wheel assembly; and (g) decelerate said wheel assembly to a stop.

23. The vehicle wheel service system of claim 22 wherein said control system is further configured with software instructions to maintain said vehicle wheel assembly at said first selected rotational speed for said third period of time during which said measuring of said imbalance is completed.

24. The vehicle wheel service system of claim 22 wherein said control system is further configured with software instructions to control said rotational speed, said rotational direction, and said acceleration to subsequently smoothly accelerate said wheel assembly from said stop to return to said second selected rotational speed or said optional third selected rotational speed, in a second and opposite rotational direction;

to measure, with said sensors, lateral forces of the vehicle wheel assembly during said rotation of the vehicle wheel assembly in said second and opposite rotational direction while in continued engagement with said load roller; and to subsequently decelerate said wheel assembly to a second stop while in engagement with said load roller following measurement of said lateral forces.

25. The vehicle wheel service system of claim 20 wherein said control system is further configured with software instructions to control a rotational speed of the wheel assembly in response to one or more characteristics of the wheel assembly, said characteristics including, but not limited to, wheel assembly inertia and wheel assembly outer diameter.

26. The vehicle wheel service system of claim 20 wherein said load roller assembly includes at least one sensor configured to detect an indication of contact between said load roller and said surface of the rotating vehicle wheel assembly, said at least one sensor selected from a set of sensors including a pressure sensor, a force sensor, and a position sensor.

* * * * *